United States Patent

[11] 3,585,759

| [72] | Inventor | Jorgen R. Andresen<br>Shaker Heights, Ohio |
|---|---|---|
| [21] | Appl. No. | 722,116 |
| [22] | Filed | Apr. 17, 1968 |
| [45] | Patented | June 22, 1971 |
| [73] | Assignee | Litton Industries, Inc. |

[54] MACHINE TOOL CONTROL SYSTEM
28 Claims, 9 Drawing Figs.

[52] U.S. Cl. ............................................. 51/165
[51] Int. Cl. ....................................... B24b 49/00
[50] Field of Search ................................... 51/165,
165.01, 165.03, 165.04, 165.07, 165.20, 165.21, 165.50, 165.60

[56] References Cited
UNITED STATES PATENTS

| 2,592,770 | 4/1952 | Waldie et al. | 51/165 X |
| 3,193,976 | 7/1965 | Luebkemann | 51/165 |
| 3,466,976 | 9/1969 | Price | 51/165 |

*Primary Examiner*—Lester M. Swingle
*Attorney*—Diller, Brown, Ramik & Holt

ABSTRACT: This disclosure relates to a control mechanism for automatically actuating a feed mechanism for a machine tool slide to shift the slide from a known prior position to a selected new position. The control mechanism primarily consists of an electrical circuit of the logic type which differs from prior utilized circuits in the following manner:

1. There is no control element such as a switch or similar device for providing a signal to indicate when the slide is in or passing through the selected position.
2. The "On The Target" signal is obtained when the output from a position indicating encoder coincides with the input from a dial or punch card.
3. The "Forward" signal is obtained when the output from the position encoder is greater than the input from a dial or a punched card.
4. The "Reverse" signal is obtained when the output from the position encoder is less than the input from a dial or a punched card.

A signal is available not only to stop a driving member, but also to signal a circuit for reversing the driving member and determining the speed at which the driving member drives the slide. The final movement of the slide towards the selected position is always in the same direction, that is, forward and at a minimum of speed referred to hereinafter as a "Creep" speed. When the slide reaches the selected position at this speed and the position signal stops the driving member, there is not sufficient inertia to carry the slide beyond the positioning movement. When the set new position of the slide is an initial position, further advance of the slide for machining operation is effected by the usual feed mechanism.

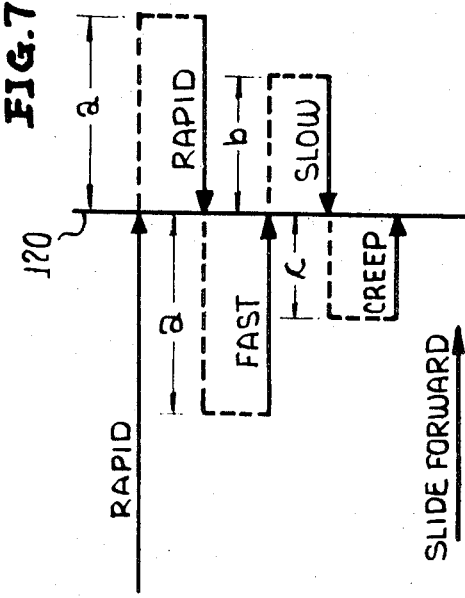
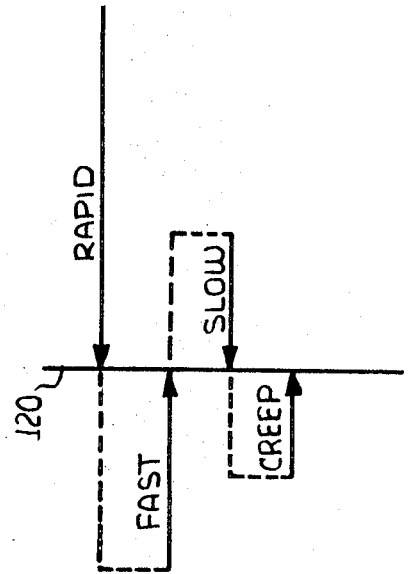
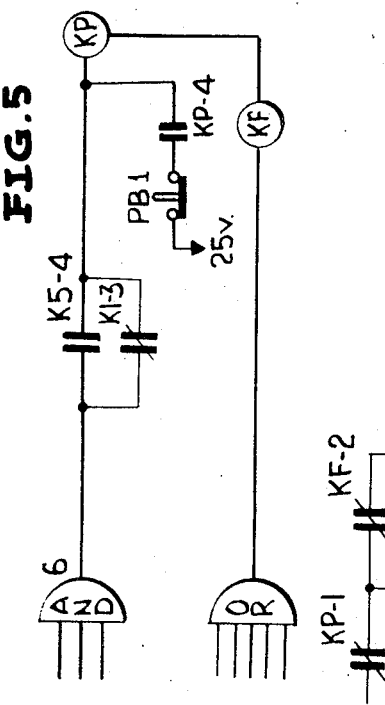
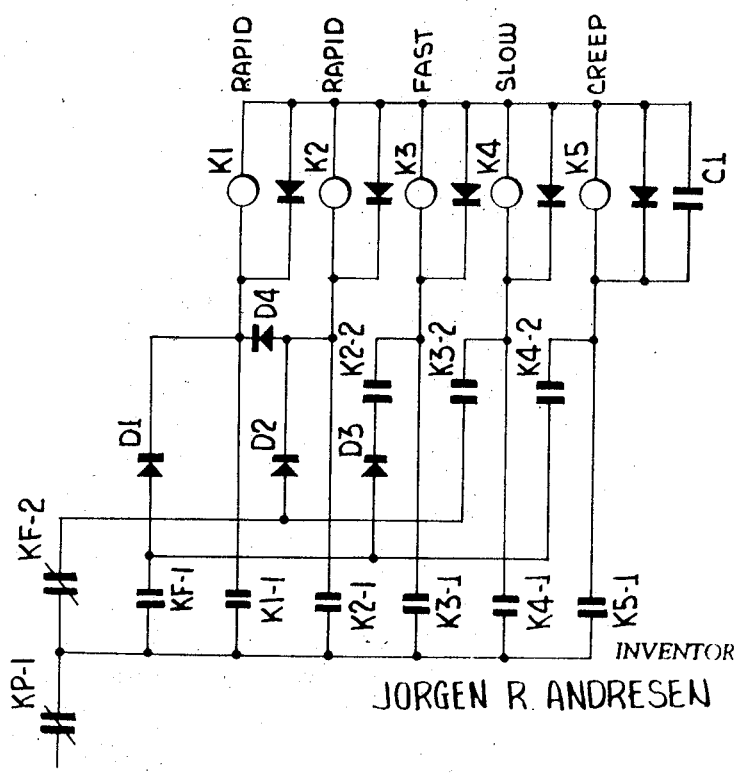

INVENTOR
JORGEN R. ANDRESEN 3,585,759

MACHINE TOOL CONTROL SYSTEM

This invention relates in general to new and useful improvements in feed mechanisms for machine tools, particularly to means for feeding a grinding wheel of a grinding machine toward and away from a workpiece, and more particularly, for rapidly adjusting the feed mechanism to change the position of the grinding wheel and the wheel support from a prior position for grinding one diameter to a selected new position for grinding another diameter.

This invention relates generally to an adjustable speed positioning device for a machine tool slide, and more particularly to a simplified control circuit for determining the speed and direction of movement of the positioning device and effecting automatic operation of the positioning device.

It will be readily apparent that when a workpiece has various portions thereof to be machined at different dimensions, it is highly desirable that a production machine tool be capable of being automatically adjusted as rapidly as possible for machining the various portions of the workpiece. It is well known that due to the mass of the slide of a machine tool and the mechanism carried thereby, the slide cannot be rapidly moved from one position to another and accurately stopped at a selected new position. Accordingly, it is desirable to provide for the slide a feed mechanism which has a driving mechanism which is capable of not only rapidly reversing direction, but also of providing for a sequential reduction in driving speed whereby the slide is positioned at the selected new position with a minimum number of control members.

In accordance with this invention there is provided a control mechanism for automatically controlling the direction and speed of the driving mechanism.

Another object of this invention is to provide a control mechanism which will automatically control the operation of the driving mechanism, the control mechanism including a simplified logic control circuit.

Another object of this invention is to provide a feed mechanism which can be rapidly adjusted for different workpiece dimensions by means of a positioning device which functions through the feed mechanism, but which is not affected by the operation of the feed mechanism during a conventional machining operation.

Another object of this invention is to provide a control circuit for determining the speed and direction of movement of a driving mechanism in accordance with the foregoing and wherein the input into the control circuit for determining the selected new position or positions of the machine tool slides may be in the form of dials, tapes, punch cards, etc.

Still another object of this invention is to provide an adjustable speed positioning system for a machine tool slide of the type wherein the machine tool slide is rapidly fed back and forth across the predetermined new position thereof at a decreasing rate and wherein the machine tool slide always approaches the selected new position from the same direction irrespective of the initial direction of movement of the machine tool slide. A further object of this invention is to provide a simplified control circuit of the logic type for determining the speed and direction of movement of a positioning device for a machine tool slide wherein the circuit includes comparator modules which operate in sequence in accordance with the most significant number of compared dimensions and wherein the circuit is a type which is energized in a predetermined sequence to provide for a repeated sequence of movement speeds and directions for each new machine tool slide position.

With the above and other objects in view that will hereinafter appear, the nature of the invention will be more clearly understood by reference to the following detailed description, the appended claims and the several views illustrated in the accompanying drawings:

IN THE DRAWINGS

FIG. 5 is a circuit diagram of a speed control circuit for the driving mechanism, which connects the logic circuit to a control circuit for actuating the hydraulic and electrical elements of the positioning mechanism.

FIG. 7 is a diagram of the movements of a slide as it is moved towards a selected new position from one direction.

FIG. 7A is a positioning movements diagram similar to FIG. 7 and shows the slide approaching the selected new position from the opposite direction.

Figure 1:
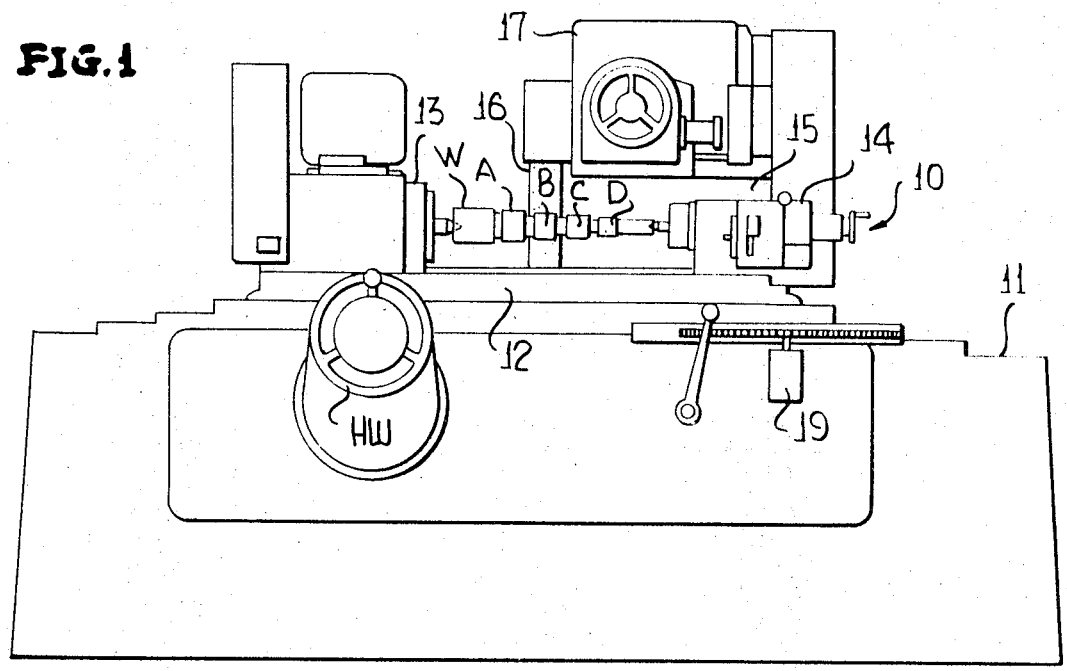
FIG. 1 is a front elevational view of a grinding machine formed in accordance with this invention and shows generally the overall details thereof.
Figure 2:
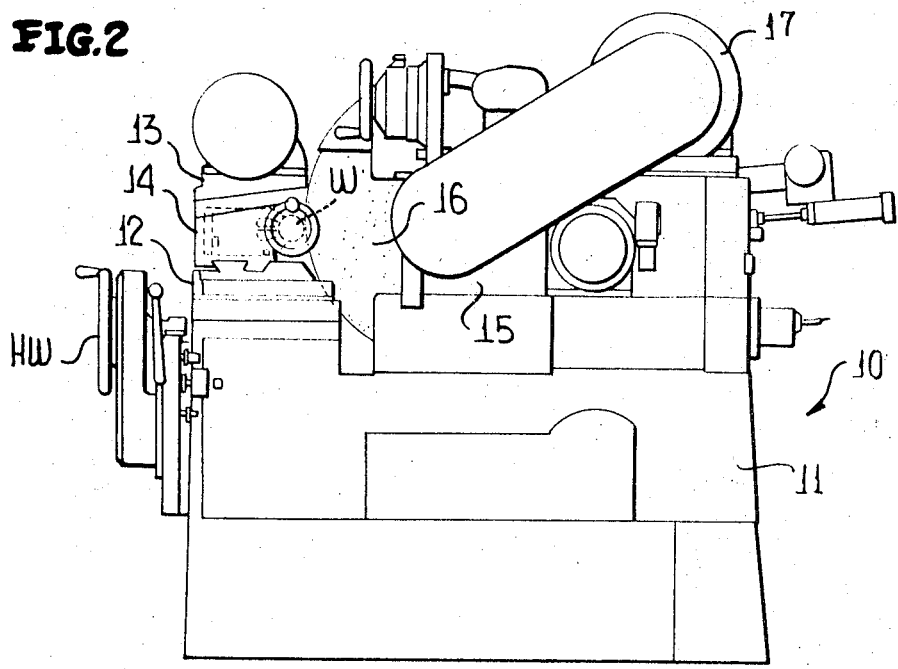
FIG. 2 is an end elevational view of the grinding machine of FIG. 1 as viewed from the right end thereof.

Referring now to the drawings in detail, it will be seen that there is illustrated in FIGS. 1 and 2 a grinding machine which is generally referred to by the numeral 10. At this time it is pointed out that although this invention may be utilized for effecting the rapid and accurate shifting of slides of all different types of machine tools to a new selected position, the invention finds a primary application in grinding machines and thus the example of the invention will be described with respect to a grinding machine.

The grinding machine 10, except for the specific feed mechanism which is the subject of this invention, is of a conventional construction and includes a bed 11. The bed 11 has amounted thereon in a conventional manner for longitudinal sliding movement a work carriage or support 12. At one end of the work support 12, there is mounted a headstock 13 which is suitable driven in conventional manner. At the opposite end of the work support 12, there is mounted a conventional type of tailstock 14. A workpiece W is mounted between the headstock 13 and the tailstock 14 for rotation by the headstock about a predetermined axis and for longitudinal shifting with the work support 12. For the purpose of illustration, longitudinal shifting of the work support 12 may be effected by a handwheel HW through a driving mechanism (not shown). It is to be noted that the workpiece W has a plurality of portions A, B, C and D which are to be of different dimensions and located at specified distances from the headstock center.

A grinding wheel support or wheel base 15, which is in the form of a slide, is slidably mounted on the bed 11 for controlled movement transversely of the work support 12 in a conventional manner. A grinding wheel 16 is carried by the wheel support 15 for rotation and is driven by means of an electric motor 17.

It is to be understood that the grinding wheel 16 is fixed longitudinally of the bed 11, but is shiftable transversely of the bed 11 both for the purpose of grinding different dimensions on the workpiece W and to compensate for variations in the diameter of the grinding wheel 16. With the grinding wheel 16 in a retracted position, the workpiece W will be positioned longitudinally of the bed 11 to position one of the portions thereof in alignment with the grinding wheel 16.

After the workpiece W has been properly positioned in alignment with the grinding wheel 16, the grinding wheel is advanced towards the workpiece to perform the grinding operation. In the past, automatic feed mechanisms for the grinding wheel support 15 to automatically effect the repeated grinding of workpiece portions to the same diameter have been provided. The purpose of this invention is to provide a further feed mechanism in the form of a positioning device or mechanism which will change the setting of the feed mechanism to provide for the grinding of various diameters without overriding the adjustment of the feed mechanism so that each diameter of the workpiece W will be accurately ground after an initial setting of the feed mechanism.

Figure 3:
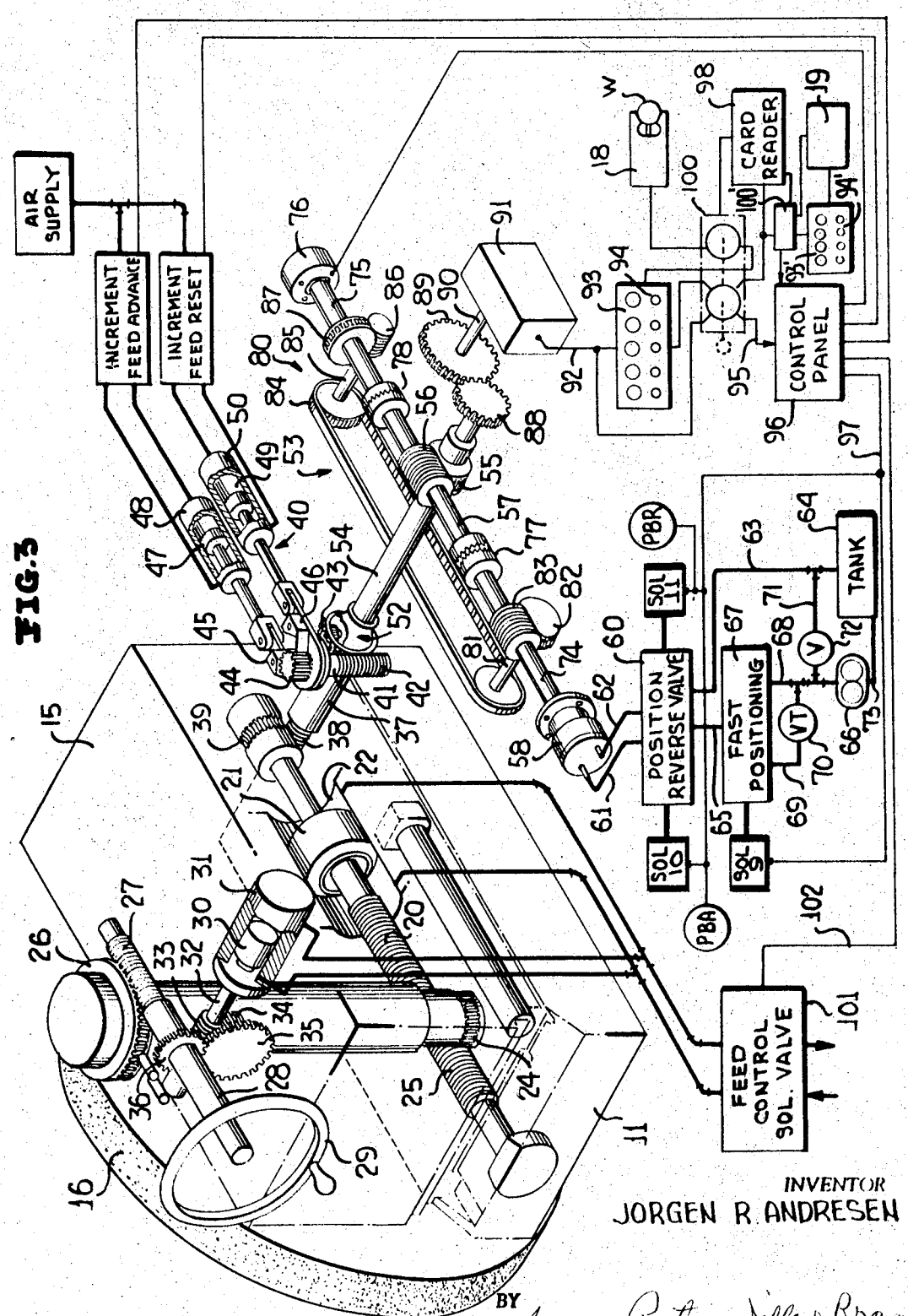
FIG. 3 is an exploded perspective view of the feed mechanism for the grinding wheel supporting slide of the grinding machine with there being schematically illustrated the control mechanism for the feed mechanism.

Referring now to FIG. 3, it will be seen that the feed mechanism for advancing and retracting the wheel support 15 includes a feed screw 20 which is slidably mounted in the bed 11. The feed screw 20 carries a piston 21 which is mounted within a cylinder 22 to effect the rapid advancing and retracting movements of the feed screw 20.

The feed screw 20 is in threaded engagement with a worm wheel 24 formed on the lower end of a vertical shaft 25. The vertical shaft 25 is carried by the wheel support 15 and extends vertically therethrough. At the upper end of the shaft 25 there is positioned another worm wheel 26. The worm wheel 26 is in operative engagement with a worm 27 carried by a handwheel shaft 28 which supports a forwardly facing handwheel 29. The shaft 28 may be selectively rotated by either the handwheel 29 or by means of a piston 30 which is mounted within a cylinder 31. The piston 30 has coupled thereto by means of a shaft 32 a rack member 33 which is meshed with a pinion 34. The pinion 34 is directly coupled to a gear 35 which, in turn, is meshed with a gear 36 carried by the shaft 28.

The feed screw 20 may also be utilized for advancing and retracting the wheel support 15 by being rotated. This is accomplished by means of a shaft 37 having a worm 38 which is meshed with a worm wheel 39 carried by the feed screw 20. A further mechanism is provided for effecting the rotation of the shaft 37, this further feed mechanism being generally referred to by the numeral 40.

The mechanism 40 is an incremental mechanism and includes a shaft 41 having formed at one end thereof a worm 42 which is meshed with a worm wheel 43 coupled to the shaft 37. At the opposite end of the shaft 41 there is a ratchet 44 which has associated therewith a pair of pawls 45 and 46 which may be actuated to selectively rotate the shaft 41 in a predetermined direction. The pawl 45 is actuated by a piston 47 mounted in a cylinder 48 while the pawl 46 is actuated by a piston 49 mounted in cylinder 50.

At this point, attention is directed to the face that the construction of the feed mechanism 40 as specifically described above, is substantially the same as that shown in U.S. Pat. Nos. 3,046,706, granted July 31, 1962 and 3,047,988, granted Aug. 7, 1962. It is to be noted that the cylinders 48 and 50 are connected to an air supply and actuation thereof is controlled by means of solenoid valve assemblies which are identified as including an Increment Feed Advance assembly and an Increment Feed Reset assembly.

In accordance with this invention, the shaft 41 is not directly coupled to the shaft 37 by the worm wheel 43. Instead, the worm wheel 43 is part of the differential transmission, which is generally identified by the numeral 52. The worm wheel 43 will be secured to the equivalent of the ring gear of the differential transmission 52 and the shaft 37 is the equivalent of an output shaft of the differential transmission 52.

Inasmuch as the differential transmission 52 is of a conventional construction, the details thereof need not be described further here except to state that there is associated with the differential transmission 52 a positioning device or mechanism which is generally referred to by the numeral 53 and includes a shaft 54 which forms the outer output shaft of the differential transmission 52. It is to be understood that the shaft 37 may be driven through the differential transmission either by the shaft 41 or the shaft 54 independently of one another and without effecting the position of one another.

The means for effecting rotation of the shaft 54 for positioning the slide or wheel support 15 includes a worm wheel 55 on the shaft 54 which is in meshed engagement with a worm 56 carried by a short shaft 57. The shaft 57 is driven by means of a hydraulic motor 58. The operation of the hydraulic motor 58 is controlled by a reversing solenoid valve 60 which is of conventional construction and which has a neutral inoperative position and left and right positions for controlling the direction of rotation of the motor 58. The reversing solenoid valve 60 is connected to the motor 58 by means of hydraulic lines 61 and 62 and has connected thereto a return line 63 which is connected to a fluid support tank 64. It also has connected thereto a supply line 65 which received hydraulic fluid under pressure from a pump 66 through a flow control valve 67 which has two positions. Flow into the valve 67 is either straight through a line 68 which provides for a fast speed of the motor 58 or through a line 69 in which there is a throttle valve 70 which provides for a slow speed of operation of the motor 58. There is also provided a bypass line 71 between the line 68 and the return line 63 with there being incorporated in the bypass line 71 a relief valve 72. The pump 66 is connected to the tank 64 by means of a line 73.

The positioning mechanism 53 also includes a pair of shafts 74 and 75 which are in alignment with the shaft 57 and which, together with the shaft 57, are suitable supported for rotation in a manner not shown. The hydraulic motor 58 is coupled directly to the shaft 74 for rotating the same. The end of the shaft 75 remote from the shaft 57 is provided with an electric brake 76. An electric clutch 77 is operable to connect the shaft 74 to the shaft 57. A second electric clutch 78 is operable to connect the shaft 75 to the shaft 57.

A reduction drive, generally referred to by the numeral 80 is provided between the shafts 74 and 75. The reduction drive 80 includes a countershaft 81 which is provided at one end with a worm gear 82 that is meshed with a worm 83 on the shaft 74. The second counter shaft 85 is coupled to the shaft 75 by means of a worm 86 thereon and a worm gear 87 on the shaft 75. The shafts 81 and 85 are connected together by a suitable sprocket and belt-type drive 84.

It will be readily apparent that the drive for the shaft 54 is one which not only may be varied in direction, but also in speed. When the valve 67 is in its fast position and the shaft 74 is directly coupled to the shaft 57, the drive is a RAPID or maximum speed drive. When the valve 67 is in its slow position, and the clutch 77 is engaged, the drive mechanism is in its FAST or second speed drive position. With the valve 67 in its fast position and the clutch 78 engaged, the drive mechanism is in its SLOW or third speed drive position. Finally, when the valve 67 is in its slow drive position and the clutch 78 is engaged, the drive mechanism is in its CREEP or minimum speed drive position.

It is to be noted that the end of the shaft 54 remote from the transmission 52 is provided with a pinion 88 which is meshed with a gear 89 carried by an input shaft 90 of a conventional rotary encoder 91. The encoder 91 is electrically connected in a conventional manner by means of wiring 92 to a combination device which includes a visual readout 93 and dimension setting switches 94. The switches 94 are suitably electrically connected by wiring 95 to a suitable control panel 96 which, in turn, is suitably electrically connected by wiring 97 to solenoids SOL 9 for the valve 67 and SOL 10 and SOL 11 for the valve 60. The valve 60 may also be suitably operated by pushbutton switches PBA and PBR. The grinding machine 10 also includes a caliper 18 which gauges the workpiece portion being ground and signals the end of the grinding operation when the dimension of the workpiece portion being ground becomes that shown on the readout 93. The caliper includes a probe which is connected to the core of a transducer (not shown) in the housing of said caliper. The probe is held in engagement with the workpiece by means of a spring. The specific details of the caliper 18 are not a part of this invention and may be in accordance with those shown in FIG. 1 of U.S. Pat. No. 3,157,971 granted Nov. 24, 1964.

The carriage 12 is shiftable after the grinding of each workpiece portion to align the next workpiece portion with the grinding wheel. This is controlled by means of an encoder 19 which is provided with a readout 93' and dial switches 94'. When the machine is set up for automatic operation, it may be provided with a card reader 98 which is coupled into the rest of the control circuit by means of selector devices 100 and 100' which will shift the control of the grinding machine from manual control through the dial switches 94 and 94' to automatic control by way of the card reader 98. The resultant signal from the card reader 98 will effect both the accurate positioning of the carriage 12 and the resetting of the positioning mechanism 53 in accordance with the diameter of the workpiece portion to be ground.

GENERAL MECHANICAL OPERATION

In the conventional operation of the feed mechanism for the slide 15, the rapid feeding thereof is affected by moving the feed screw 20 axially by means of the piston 21. The threads of the feed screw 20 engage the teeth of the worm wheel 24 and the vertical shaft 25 so that the shaft 25 and the slide 15 move as a unit with the feed screw 20.

At the end of the rapid feed movement, the grinding feed is indicated by movement of the piston 30 to the left, causing rotation of the handwheel 29, the handwheel shaft 28 and the worm 27. The rotation of the worm 27, through the worm wheel 26, effects the rotation of the shaft 25 in the slide 15. As the worm wheel 24 rotates, it functions as a pinion in engagement with the threads 23 of the feed screw 20 and advances the slide 15 relative to the feed screw for the grinding operation.

At the end of the movement of the piston 30, if the work has not yet been ground to the desired dimension, the increment feed of the feed mechanism 40 is initiated by the reciprocation of the piston 47 which actuates the pawl 45 to rotate the shaft 41 through the ratchet 44. The rotating shaft 41, through the worm 42 and the worm wheel 43, drives the shaft 37.

The rotation of the shaft 37 results in the rotation of the feed screw 20 through the worm 38 and the worm wheel 39. As the feed screw 20 rotates, the worm wheel 24 functions as a nut and serves to advance the shaft 25 and slide 15 relative to the feed screw 20 in a manner which may vary from one workpiece to another, until a suitable size control device, such as the caliper 18, signals that the workpiece is ground to the desired dimension and the end of the grinding operation has been reached. This rotation of the feed screw 20 is independent of rotation by the motor 58 and does not effect the setting of the feed mechanism for a specific diameter.

The signal from the caliper 18 will cause retraction of the rapid feed piston 21 and the grinding feed piston 30 to reset these elements of the feed mechanism. The same signal will also cause a fixed number of reciprocations of the piston 49 and pawl 46 connected thereto to rotate the ratchet 44 and worm 42 in a direction to cause reverse rotation of the feed screw 20 to reset it a fixed amount from the point to which it had been advanced. At this time, it is pointed out that the feed screw 20 does not move endwise when turned, and moves endwise only for rapid feed.

It is to be understood that the movement of the pistons 21 and 30 is controlled by means of a feed control solenoid valve which has suitable hydraulic lines connected to the cylinders 22 and 31 and to the pump 66 and the tank 64. The feed control solenoid valve, which is identified by the numeral 101 is connected by means of suitable wiring 102 to a control panel 96 for automatic actuation. In a like manner, the means for controlling the flow of air under pressure to the cylinders 48 and 50 are electrically connected to the control panel for automatic operation.

The operation of the feed mechanism, as just described, is substantially the same at that disclosed in the aforementioned U.S. Pat. Nos. 3,046,706 and 3,047,988, except to the extent that it provides a precision modification of the position means.

The positioning of the feed mechanism and slide 15 for grinding widely varying diameters on a workpiece is accomplished by rotation of the feed screw 20. The motor 58 drives the shaft 57, either directly or indirectly, and through the worm 56 and the worm wheel 55, rotates the shaft 54. The shaft 54, which is connected to the shaft 37 through the differential transmission 52 provides for the rotation of the feed screw 20 even through the shaft 41 and the worm 42 thereof remain stationary. The positioning movement of the slide 15 is stopped when the position of the rotary encoder 91 corresponds to the dimension setting of the switches 94 or that provided by a punch card (not shown) positioned within the card reader 98. This movement of the motor 58 is also transmitted through the pinion 88 and the gear 89 to the encoder 91, which in turn, transmits suitable signals to the visual readout 93. The readout 93 shows the dimension to which the workpiece portion is to be ground. It does not represent the position of the grinding wheel 16 at the end of the positioning movement. After the positioning movement, the grinding wheel 16 is further advanced by the feed mechanism 40 for grinding the workpiece W. As pointed out before, the dimension shown in the visual readout 93 is the dimension of the workpiece when the caliper 18 signals the end of the grinding operation.

At this time it is pointed out that when the caliper 18 is shifted from a large workpiece portion to a smaller workpiece portion, the spring thereof (not shown) shifts the probe accordingly to engage the small workpiece portion, and with the change in diameter of the portion due to grinding, the probe moves in a different zone. A certain point in this zone corresponds to the dimension represented by the new dial or punch card setting. When the workpiece had been ground to the new diameter called for, the core of the encoder 91 will have moved into the longitudinal position corresponding to the new diameter and will produce a signal either through the dial switches 94 or the card reader 98 through the control panel 96 to shift the feed control solenoid valve 101 to stop the grinding operation.

ELECTRONIC CONTROL

Although the controls for the feed mechanism and positioning mechanism have been described above only in generalities and only diagrammatically illustrated in FIG. 3, it is to be understood that the specific details of the control circuitry are the true subject of this invention.

Figure 4:
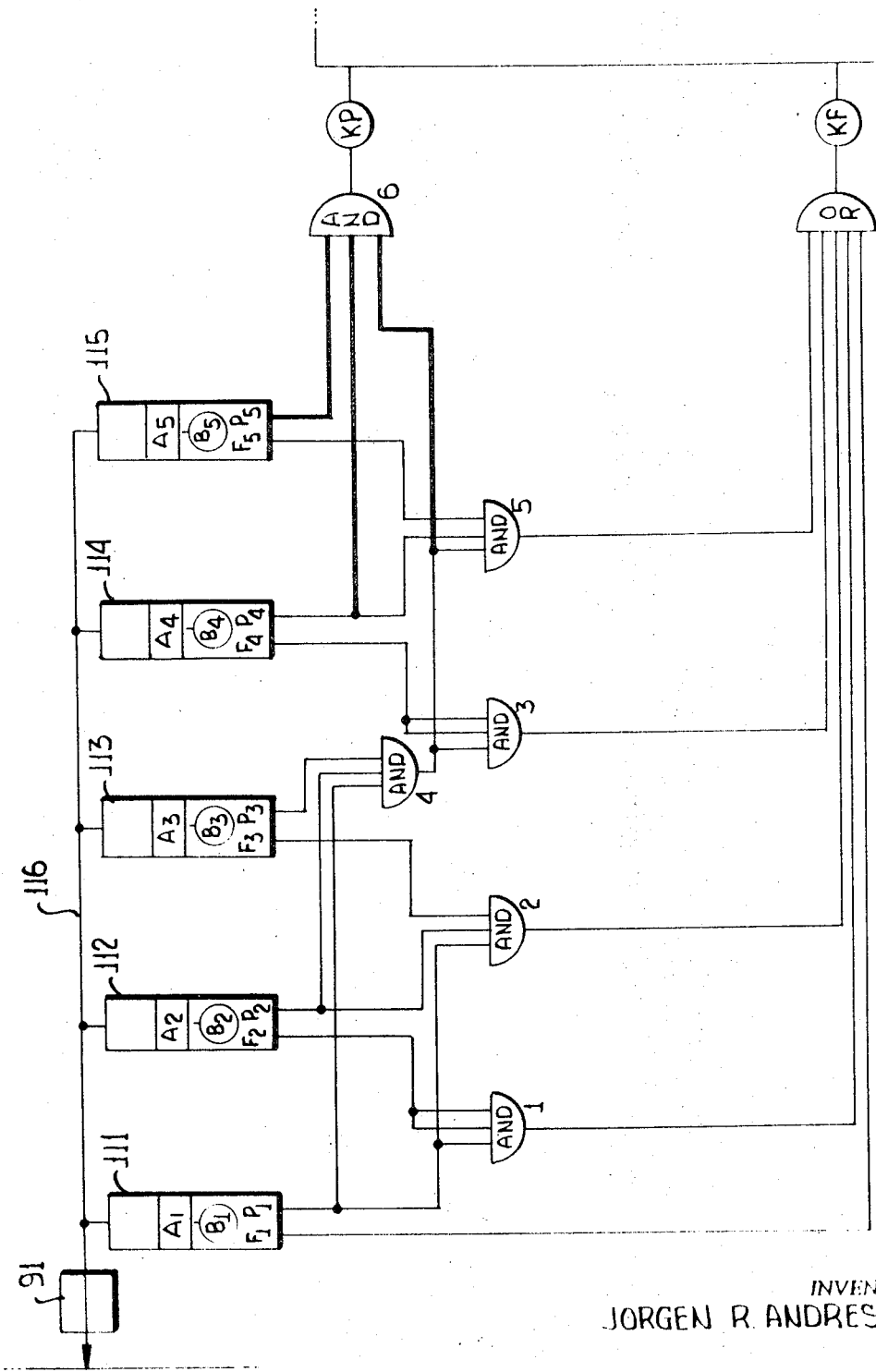
FIG. 4 is a circuit diagram of a logic circuit which controls the direction of movement of a driving mechanism of the positioning device.

Referring now to FIG. 4, it will be seen that there is disclosed a logic circuit which received from a punch card the information necessary to control the position of the feed screw 20 to, in turn, position the slide 15 for a selected dimension of the workpiece being ground. A similar circuit controls the longitudinal positioning of the work carriage 12. The logic circuit employs comparator modules in accordance with the number of digits of the workpiece dimension. In the illustrated logic circuit there are five comparator modules identified by the numerals 111, 112, 113, 114 and 115 in the direct sequence of the digits. The comparator modules are identical and the circuit diagram of a typical comparator module appears in FIG. 8. A description of FIG. 8 appears hereinafter.

It is to be noted that the comparator modules 111—115, inclusive, are schematically shown and each has two areas identified by the letters A and B. The letters A of the comparator modules indicate the actual position of the wheel base 15 as signalled by the encoder 91. The letters B represent the dial or other input digits of the finished dimension of a workpiece portion in position for grinding.

The comparator modules are suitably connected by means of wiring 116 to the encoder 91. Each of the comparator modules is provided with output terminals F and P. The construction of the comparator modules is such that a FORWARD signal F is present when the readout A is larger than the target value B. The POSITION signal P is present when the readout A and the target value B are equal and only then. The condition of the signals F and P for each of the comparator modules is as follows:

When A is greater than B, F equals one.
When A is equal to or less than B, F equals zero.

When A equals B, P equals one.

When A is not equal to B, P equals zero.

It will be readily apparent from FIG. 4 that in the logic circuit, the five comparator modules have output terminals F1, F2, F3, F4 and F5, and P1, P2, P3, P4 and P5.

It is to be noted that the logic circuit includes six AND gates 1 through 6, inclusive, and a single OR gate. The AND gate 6 controls the energization of a relay KP whereas the OR gate controls the energization of a relay KF.

BASIC OPERATION OF LOGIC CIRCUIT

In order that the basic operation of the logic circuit may be understood without referring at this time to the complete control circuit, it is to be understood that the relay KF has a set of normally opened contacts which will signal the positioning mechanism 53 to move the slide 15 forward to a smaller diameter, and a set of normally closed contacts which will signal the positioning mechanism 53 to move the slide in the reverse direction, that is to a larger diameter. These contacts will be more specifically identified hereinafter.

The basic logic is based on the principle that signals are always obtained from the Most Significant Digit (MSD) not in position.

It can be seen that with the signal from terminal F1 into the OR gate, relay KF will be energized. The feed screw 20 and the encoder 91 will be advanced until the readout is smaller than the target. At this point, relay KF will drop out and slide 15 will retract until the readout is greater than the target, at which point relay KF will again be energized and the slide 15 will again advance. With no other controls present, this would repeat itself and the slide 15 would oscillate back and forth around the target point. This situation is, of course, not desirable and it is necessary to implement additional controls to prevent this oscillation.

Assuming that the feed screw and the slide 15 were advancing, when the readout equals the target of the first digit, the FORWARD signal F becomes no longer present and the relay KF would deenergize if it does not get any other signals.

Terminal P1 is present when the readout of comparator module 111 equals the target. With terminal P1 present, the Second Significant Digit (2ndSD) now takes over the control. To safeguard that the 2ndSD does not take over the control before the MSD is in position, the AND gate 1 is used. It is to be noted that the AND gate 1 has the other two inputs thereof connected to the terminal F2 which will be present as long as the readout of the comparator module 112 is greater than the target thereof. Under these conditions, the AND gate 2 has an output which is directed to the OR gate which, in turn, results in the energization of the relay KF with the relay KF remaining energized until the readout and the target of the comparator module 112 are equal.

The AND gate 2 receives its input signal from terminals P1 and P2. These will now be present. The third input to the AND gate 2 is the output or signal F3 of the comparator module 113. When the readout of the comparator module 113 is greater than the target, the AND gate 2 will have an output which will signal the OR gate to energize the relay KF. The signal energizing the relay KF is present until there is equality between the readout and the target of the comparator module 113, at which point signal F3 disappears and signal P3 is present.

In order to obtain further progress down the line, it is necessary that AND gate 3 be made operational. However, it is to be noted that AND gate 3 is controlled by AND gate 4. The AND gate 4 has the inputs thereof connected to the terminals P1, P2 and P3. At this time inputs from all three of these terminals should be present and the AND gate 4 should have an output.

The AND gate 3 has one input thereof connected to the output of the AND gate 4. The other two inputs of the AND gate 3 are connected to the terminal F4. When the readout of the comparator module 114 is greater than the target thereof, signal F4 is present and as a result the AND gate 3 has an output which makes the OR gate operational to energize the relay KF. When the readout of the comparator module 114 equals the target, the signal F4 disappears and signal P4 appears. At this point, terminal F5 becomes the controlling factor.

It is to be noted that the AND gate 5 is controlled by the AND gate 4, the signal P4, and signal F5. Inasmuch as there are already outputs from the AND gate 4 and the signal P4, when the readout of the comparator module 115 is in excess of the target, signal F5 will be present and the AND gate 5 will become operational. This, in turn, will make the OR gate operational so as to energize the relay KF.

After the equality has been established in the Least Significant Digit (LSD) as determined by the comparator module 115, signal F5 disappears and signal P5 appears. At this point, all readouts are equal to their associated target, or, in other words, the preset five digit number has been reached.

It is to be noted that when all readouts are equal to their associated target, the AND gate 6 is made operational in that two of its inputs are connected to the terminals P4 and P5 while the third is connected to the output of the AND gate 4. Thus, the AND gate 6 will have an output which will energize the IN POSITION relay KP.

The logic circuit of FIG. 4 controls the movement of the slide 15 by the feed screw 20 under all relationships of the target dimension to that of the existing dimension. When the slide is adjusted for the target position, the relays KP and KF are set to call for no further adjustment of the positioning mechanism 53. When the slide is disposed at a position wherein the target reading is greater than the slide position reading, movement of the slide in a reverse direction will be effected until it reaches the target position or null point 120. On the other hand, when the target dimension is less than that of the existing dimension, the logic circuit will be operative to energize the relay KF and effect the driving of the feed screw 20 to move the slide 15 towards the target point.

It is also pointed out at this time that while a five input OR gate is required, and notwithstanding the fact that there are five comparator modules, it is to be noted that all of the AND gates are of the three input type. The logic circuit is designed to use identical AND gates having a number of inputs less than the number of control comparator modules. It will be readily apparent that this arrangement is efficient both from the standpoint of initial costs and the maintaining of replacement components. Particular attention is directed to the use of the three input AND gate 4 which permits the comparator modules 111, 112 and 113 to maintain a control over the AND gates 3 and 5 of the comparator modules 114 and 115, respectively, of a nature which requires the readouts of comparator modules 111, 112 and 113 be equal to their respective targets in order to provide the first input to AND gate 6.

Referring now to FIG. 7, it will be seen that there is schematically illustrated the movement of the slide 15 relative to the desired target position or null point, the line of which is identified by the numeral 120. It has been previously described that the positioning mechanism 53 in addition to being reversible, has four separate speeds identified as RAPID, FAST, SLOW and CREEP. When the readout at the beginning of a positioning cycle is greater than the target dimension, the movements of the slide with respect to and terminating in alignment with the target point 120, will be that schematically shown in FIG. 7. First, the positioning mechanism 53 will drive the feed screw 20 with the RAPID drive in a forward direction. The driving of the feed screw 20 and the slide 15 will terminate when the slide reaches the target point 120. However, the momentum of the drive will carry it past the target point 120 a distance of a dimension $a$. Then the direction of rotation of the feed screw 20 will be reversed so that the slide will be driven reversely towards the target point 120 while still being driven at the RAPID speed. When the slide again reaches the target point 120, the reverse drive will be discontinued and the momentum of the slide will carry it past the target point 120 on the high side thereof again the distance $a$.

After the slide 15 passes to the high side of the target point 120, the feed screw 20 will be reversed to advance the slide towards the target point 120. However, the drive of the positioning mechanism 53 is now in FAST speed. The driving of the feed screw 20 again discontinues when the slide 15 reaches the target point 120. However, the slide drifts to the lower side of the target point 120 due to the inertia thereof. The dimension $b$ of the drift, however, is not as great as the drift dimension $a$.

As the slide 15 passes the target point 120, the forward movement thereof is reversed and the drive for the feed screw 20 is shifted to the SLOW speed thereof. When the slide 15 again reaches the target point 120, the reverse drive is discontinued. However, there is a certain movement of the slide past the target point 120 on the high side a distance $c$ which is less than the distances $a$ and $b$. The logic circuit operates the positioning mechanism 53 to again forwardly drive the feed screw 20, but at a very slow speed previously identified as CREEP speed. Inasmuch as the slide only has a very short distance to move to the target point and is moving at a very slow rate, when the readouts of the comparator modules equal the target dimensions, driving of the feed screw 20 will stop and the slide 15 will stop at the target point 120. It is to be noted that the slide approaches the target point 120 from the high side.

Reference is now made to FIG. 7A. It is to be noted that at the start of the positioning of the feed screw 20 and the slide 15, the slide is on the low side of the target. As a result, there is a reverse driving of the feed screw 20 at the RAPID speed corresponding to the second movement of FIG. 7. Once the slide reaches the target point 120, the continued driving of the feed screw 20 and the movement of the slide 15 is identical to that described with respect to FIG. 7 and the slide approaches the target point 120 in the final movement at CREEP speed and from the high side.

SPEED CONTROL CIRCUIT

Referring now to FIG. 5, it will be seen that there is illustrated a feed control circuit for controlling the feed rate of the positioning mechanism 53. Normally closed contact KP1 remains closed as long as the slide 15 is not at the target point to make current available to all speed control relays to be described hereinafter. Assuming that the first movement is the changing of the position of the slide from a larger dimension to a smaller dimension, the logic circuit operates to provide a forward signal for energizing relay KF.

When the relay KF is energized, a circuit is completed through normally closed contact KP1, contact KF1 and diode D1 to energize relay K1. This results in the closing of a holding circuit through contact K1-1. The relay K1 controls a RAPID speed circuit.

Figure 6:
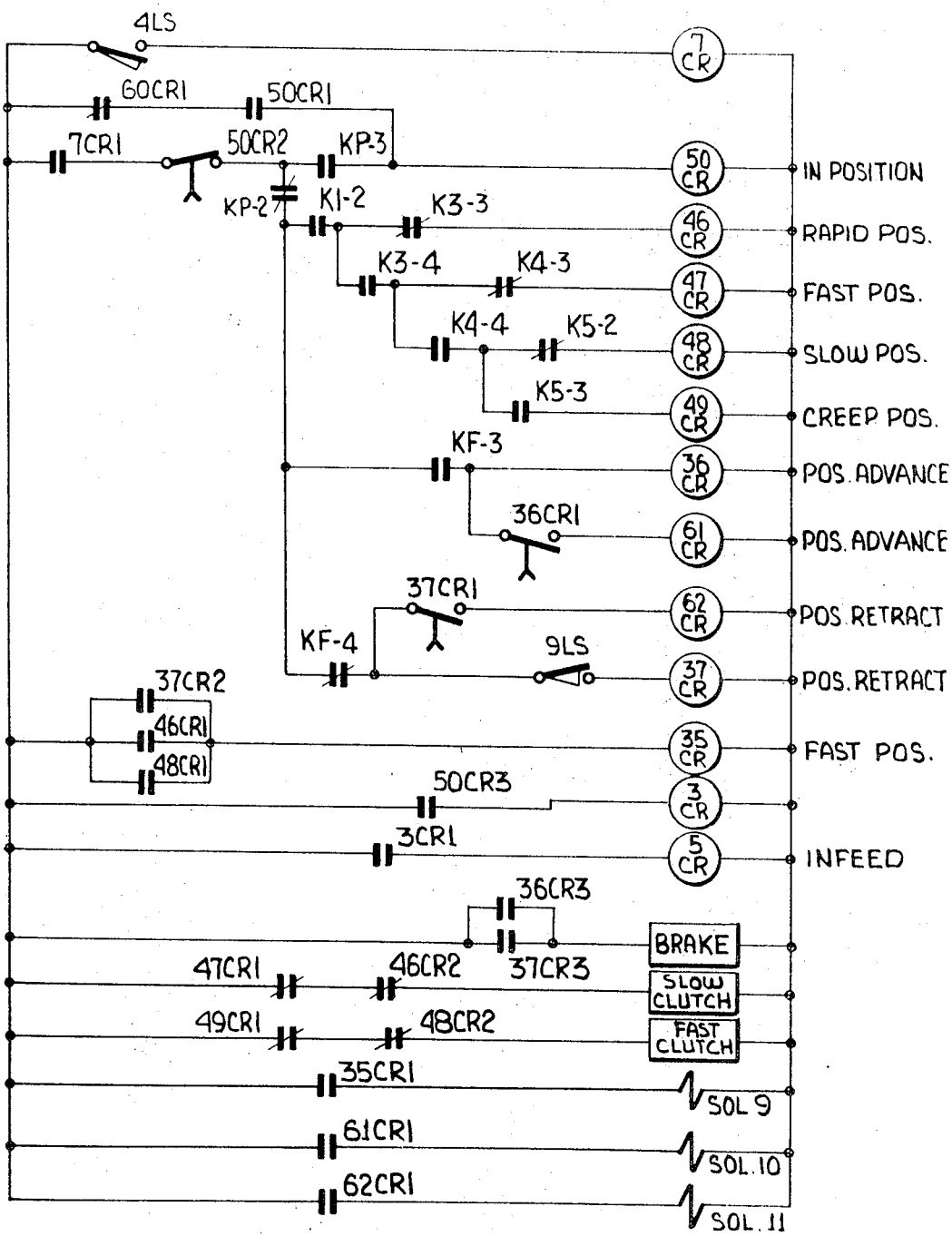
FIG. 6 is a circuit diagram of the control circuit for the positioning mechanism.

Referring now to FIG. 6, it will be seen that there is illustrated a machine control circuit which is primarily controlled by a limit switch 4LS which is now closed, energizing relay 7CR. The relay 7CR, when energized, results in the closing of contact 7CR1 to complete a portion of a circuit which includes normally closed contact 50CR2 and normally closed contact KP2.

When the relay K1 is energized, contact K1-2 closes in a circuit through normally closed contact K3-3 to complete the circuit to RAPID positioning relay 46CR. Contact 46CR1 then closes to energize FAST positioning relay 35CR. This, in turn, results in the closing of contact 35CR1 to energize solenoid SOL 9 which, as in shown in FIG. 3, results in the shifting of fast positioning valve 67 to the right and directing an unrestricted supply of fluid under pressure from pump 66 through line 65 to the position reversing solenoid valve 60.

At the same time, normally closed contact 46CR2 opens to deenergize slow clutch 78, leaving fast clutch 77 closed.

It is also to be noted that contact KF3 closes to complete a circuit to energize relay 36CR. This results in the timed closing of contact 36CR1 to energize position advance relay 61CR. Contact 61CR1 then closes to energize solenoid SOL 10, shifting position reversing solenoid valve 60 to the right and directing fluid under pressure through line 61 to rotate the motor 58 at a fast speed in a forward direction.

It will be thus apparent that at this time the positioning mechanism 53 drives the feed screw 20 forwardly at RAPID speed in a direction to advance slide 15 towards the selected target position.

When the momentum of the slide 15 carries the slide 15 past the target position 120 of FIG. 7 in the forward direction, the slide 15 moves into a reverse zone in which relay KF is deenergized. However, relay K1 remains energized through the holding circuit provided by contact K1-1. At this time a circuit is completed through normally closed contact KP1 and normally closed contact KF2 and diode D2 to energize relay K2. A holding circuit to relay K2 is then closed by the closing of contact K2-1.

Contact K2-2 also closes so as to partially complete a circuit through diode D3 to the relay K3 whereby the relay K3 will be energized next time the forward contact, normally open KF1, is closed.

It is pointed out at this time that inasmuch as relay K1 is already energized, no current flows through diode D4. Also, RAPID positioning relay 46CR remains energized as well as FAST positioning relay 35CR and fast clutch 77.

Referring once again to FIG. 6, it will be seen that normally closed contact KF4 completes a circuit through wheelbase safety switch 9LS, which is now closed, to energize the position retract relay 37CR. As a result, contact 37CR1, which is a timing contact, time close to energize position retract relay 62CR. Contact 62CR1 closes to energize solenoid SOL 11, shifting the reverse solenoid valve 60 to the left and directing fluid under pressure through the line 62 to drive the motor 58 at a rapid speed in a reverse direction to retract slide 15 in the direction of the target point 120.

It is pointed out here that the slide 15 is moving at a RAPID speed. When the target point 120 is reached going in the reverse direction, the slide 15 again passes through the target into the forward zone due to the inertia of the slide and the driving mechanism therefor. At this time, the readout of the comparator modules is again higher than that of the target dimension and as a result, relay KF is again energized and a circuit is completed through the contact KF1, diode D3 and previously closed contact K2-2 to energize the relay K3, as is shown in FIG. 5. The relay K3 is held closed by the closing of a contact K3-1 in a holding circuit therefor.

At this time contact Ke-2 closes in the circuit to relay K4 whereby when the relay KF is deenergized and normally closed contact KF2 again resumes its closed position relay K4 will be energized.

Normally closed contact K3-3 (FIG. 6) now opens in the circuit for RAPID speed, deenergizing RAPID positioning relay 46CR. At the same time, contact K3-4 closes to complete a circuit through normally closed contact K4-3 to energize the FAST positioning relay 47CR. This results in the opening of normally closed contact 47CR1 to again deenergize the slow clutch 78 so that the motor 58 is still connected through the fast clutch 77 to the shafts 57, 54 and 37 to drive the feed screw 20.

The energizing of relay KF also results in the closing of contact KF3 to energize relay 36CR. As a result, timing contact 36CR1 times closed to energize the position advance relay 61CR. The fast positioning relay 35CR is not energized at this time and accordingly, the fast positioning valve 67 remains in the left-hand position, directing fluid from pump 66 through the restricted line 69 to the motor 58 so as to drive the motor at a slow speed. At the same time, contact 61CR1 closes to energize solenoid SOL 10, shifting the position reversing valve 60 to the right, directing the restricted supply of fluid through line 61 to drive the motor 58 forward at a slow speed as determined by the setting of the throttle valve 70.

The feed screw 20, driven through the fast clutch by the motor 58 running at a slow speed, advances the slide 15 at the FAST speed towards the target point 120. However, because of the inertia of the slide, despite the reduction in the speed thereof, the slide moves past the target point 120 into the reverse zone, again deenergizing relay KF.

Referring once again to FIG. 5, it will be seen that a circuit is now completed through normally closed contact KP1, normally closed contact KF2 and previously closed contact K3-2 to energize relay K4. The relay K4 is held in an energized condition by the closing of a holding circuit including contact K4-1. At the same time, contact K4-2 closes in the circuit to relay K5. However, contact KF-1 is now opened and the circuit will not be completed until contact KF1 is again closed.

Normally opened contact K4-4 (FIG. 6) now closes in the circuit through previously closed contacts K1-2 and K3-4, as well as normally closed contact K5-2 to energize slow position relay 48CR. Contact 48CR1 now closes to energize fast position relay 35CR, thereby energizing solenoid SOL 9 and shifting fast positioning valve 67 to the right to provide an unrestricted supply of fluid under pressure to the position reversing valve 60 and the motor 58.

Normally closed contact 48CR2 opens to deenergize the fast clutch 77, leaving the slow clutch 78 energized and operative. Normally closed contact KF4 at this time completes a circuit through normally closed wheelbase safety switch 9LS to again energize the position retract relay 37CR.

At this time contact 37CR1 closes after the timed interval to energize the position retract relay 62CR. Also, contact 37CR2 closes to energize relay 35CR and solenoid SOL 9 to shift the fast positioning valve 67 to the right to direct a full flow of fluid under pressure through the line 68 to the valve 60.

Contact 62CR1 closes to energize solenoid SOL 11, shifting the valve 60 to the left and directing unrestricted fluid under pressure from valve 67 to drive the motor 58 at a fast speed in the reverse direction. The motor 58 is now connected to the shaft 54 through the shaft 74, worm 83, worm wheel 82, shaft 81, drive 84, shaft 85, worm 86, worm gear 87, shaft 75, clutch 78, shaft 57, worm 56 and worm wheel 55 to drive the feed screw 20 in the reverse direction to shift the slide 15 at the SLOW speed.

As the slide 15 passes the target point 120, the drive therefor is again discontinued, and although the slide is moving at a much slower speed than before, it still has sufficient momentum to slide to the high side of the target point 120, thereby again energizing the logic circuit. The logic circuit will again energize relay KF. At this time, a circuit is completed through contact KF1 and previously closed contact K4-2 to energize relay K5. This completes a holding circuit for relay K5 through contact K5-1 which now closes. Contact K5-3 closes in the circuit with previously closed contacts K1-2, K3-4 and K4-4 to provide a circuit to energize CREEP positioning relay 49CR. At the same time, contact K5-4 closes in the circuit between AND gate 6 and relay KP.

Normally closed contact 49CR1 opens to deenergize fast clutch 77, leaving the slow clutch 78 energized. The FAST positioning relay 35CR remains deenergized along with solenoid SOL 9, leaving the FAST positioning valve 67 in the left-hand position to provide a restricted flow of fluid to the motor 58 through the throttle valve 70.

Contact KF3 closes in the circuit to energize position advance relay 36CR. At this time, contact 36CR1 times close to energize position advance relay 61CR. As a result, contact 61CR1 closes to energize solenoid SOL 10, shifting the valve 60 to the right and directing fluid under pressure through the line 61 to drive the motor 58 in a forward direction at a slow speed determined by the setting of the throttle valve 70.

The motor 58 acts through the previously described drive connection utilizing the slow clutch 78 to drive the feed screw 20 and advance the slide 15 towards the target at CREEP speed. When the target point 120 is reached, the IN POSITION signal from the AND gate 6 completes a circuit through contact K5-4 to energize relay KP.

It is pointed out at this time that the inertia of the slide 15, when driven at the CREEP rate is not sufficient to carry the slide 15 beyond the target point 120 and it stops in the target position.

When the relay KP is energized, normally closed contact KP1 opens, deenergizing all speed control relays K1 through 5 and resetting the various contacts. At the same time, normally closed contact KP2 opens and normally open contact KP3 closes to complete a circuit through contact 7CR1 and normally closed contact 50CR2 to energize the IN POSITION relay 50CR. Contact 50CR1 now closes in a holding circuit for the relay 50CR including the normally closed traverse reset contact 60CR1. Also, timing contact 50CR2 times open after a predetermined interval and serves along with previously opened contact KP2 to deenergize the position speed control circuits as well as the initial circuit to relay 50CR. Contact 50CR3 closes to energize relay 3CR and as a result, contact 3CR1 closes to energize infeed relay 5CR. A contact (not shown) of relay 5CR closes to start the customary advance of the slide 15 and the grinding wheel 16 for a normal grinding operation. When the slide 15 advances for the normal grinding operation, relay 7CR is deenergized by the opening of limit switch 4LS. Contact 7CR1 now opens in the circuit to relay 50CR so that the relay cannot be energized again until slide 15 is retracted at the termination of the grinding operation.

When the positioning mechanism 53 must move the slide 15 for grinding a larger dimension than previous ground, neither the AND gate 6 nor the OR gate will have an output and neither the relay KP or the relay KF will be energized. Accordingly, a circuit is completed through normally closed contact KP1, normally closed contact KF2 and Diodes D2 and D4 to energize rapid feed relay K1. The shifting of the slide 15 relative to the target point 120 will be the same as that previously described for the movement of the slide 15 from a larger readout dimension to a smaller target dimension after the initial movement of the slide past the target point 120. It is to be noted that the slide is finally fed to the target point 120 from the high side at a CREEP speed.

It is to be noted that parallel to the contact K5-4 in the line between the AND gate 6 and the relay KP, there is a bypass circuit controlled by normally closed contact K1-3. This prevents resetting of the speed control circuit when the machine is at the target point.

A holding circuit for the relay KP is completed by the closing of contact KP-4. This holding circuit includes a reset pushbutton PB1.

Figure 8:
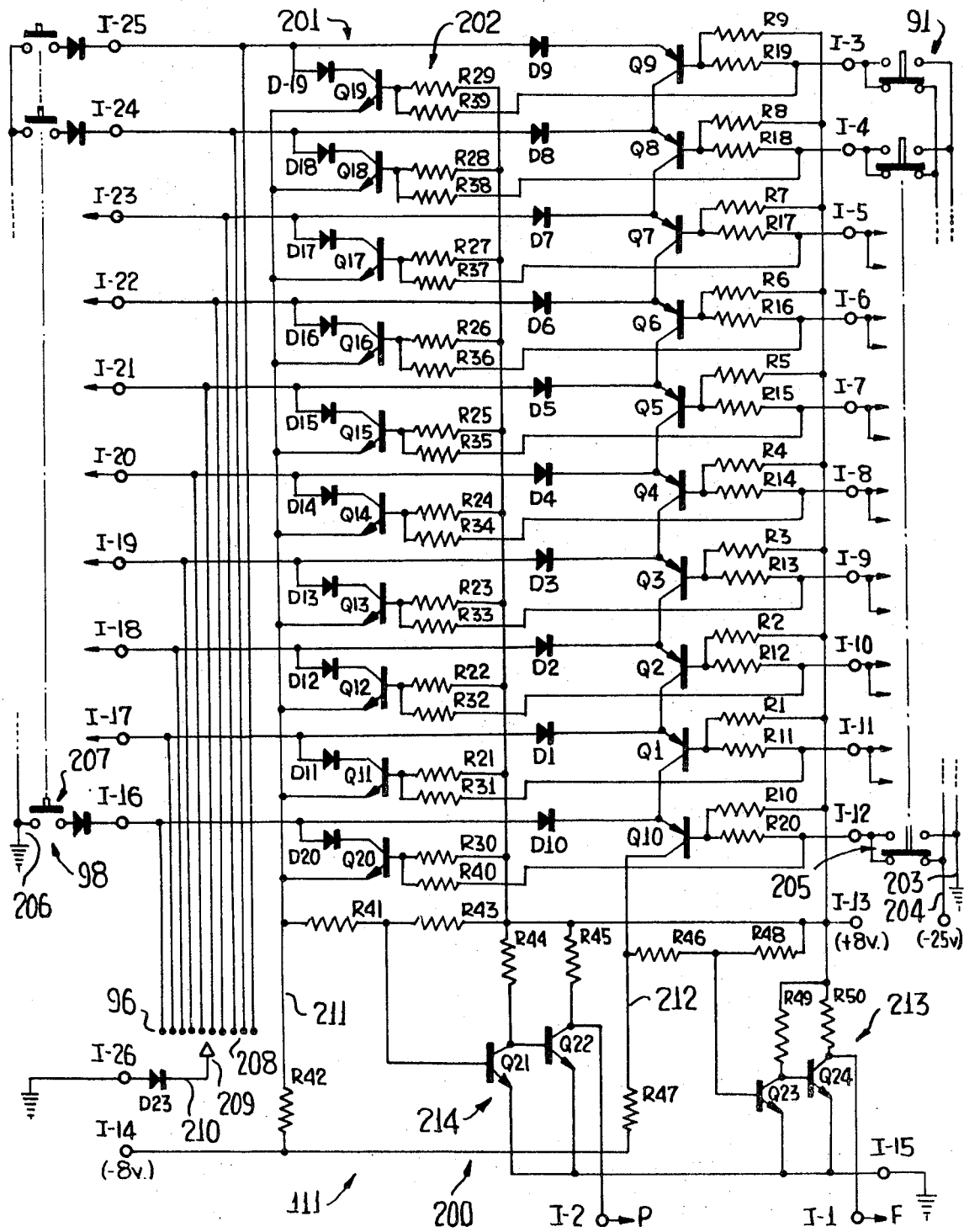
FIG. 8 is a circuit diagram of a comparator module.

Reference is now made to FIG. 8 wherein there is illustrated the details of the circuitry of one of the comparator modules. For identification purposes only, the illustrated comparator module is identified as the module 111 on FIG. 4. Basically, the comparator module 111 includes a voltage divider circuit, which is generally referred to by the numeral 200 and a control system, which is generally referred to by the numeral 201, the control system 201 being connected to the voltage divider circuit 200 in a manner to be described hereinafter for selectively unbalancing the voltage divider circuit 200 to provide for predetermined outputs therefrom in accordance with predetermined arrangements of inputs to the control system 201. The control system 201 includes 10 identical control circuits 202 which are commonly connected to leads from the voltage divider circuit 200 in identical arrangements.

It is to be noted that the comparator module 111 is designed to be of the plug in type and includes inputs I-1 through I-26. Input I-1 is connected to the terminal F while input I-2 is connected to the terminal P. Inputs I-3 through I-12 are connected to the encoder 91 and correspond to the numerals 9 through 0 of the respective dimension control digit of the encoder 91. The input I-13 connects the voltage divider circuit 200 to a + 8v. source while the input I-4 connects the said voltage divider circuit to a − 8v. source. Input I-15 connects the voltage divider circuit 200 to ground. Inputs I-16 through I-26 are connected to the card reader 98 and correspond to the numerals 0 through 9 of the respective dimensional digit controlled by the comparator module 111. The input I-26 is part of manual control switching mechanism 94 and connects the same to ground.

At this time it is pointed out that the encoder 91 includes two primary leads 203 and 204 which are connected to ground and to a — 25v. source, respectively. For each of the inputs I-3 through I-12, there is a double-throw double-pull switch 205 which is operable to selectively connect the respective input to either ground or the — 25v. source through the leads 203, 204. The normal position of each switch 205 connects the respective input to the — 25v. source.

The card reader 98, for the respective digit controlled by the comparator module 111, has a lead 206 which is connected to ground. For each of the inputs I-16 through I-25 there is a control switch 207 which is normally opened, but which is movable to a position connecting the respective input to ground.

The illustrated control switch of the control panel 96 is conventionally illustrated as having 10 stationary contacts corresponding to the numerals 0—9 from left to right, the fixed contacts being generally identified by the numeral 208. The control panel 96 also includes a movable contact 209 which is selectively engageable with one of the 10 fixed contacts 208 to conclude a circuit through a lead 210 to input I-26 and then to ground. The lead 210 has incorporated therein a diode D23.

The voltage divider circuit 200 includes a first circuit 211 between inputs I-13 and I-14 which includes resistors R41, R42 and R43 arranged in series. A second circuit 212 between the inputs I-13 and I-14 includes resistors R46, R47 and R48 which are identical to the resistors R41, R42 and R43, respectively.

The voltage divider circuit 200 includes a first control unit 213, the output of which controls an output at the terminal F. The control unit 213 includes a transistor Q23 having a base drive coupled to the circuit 212 between the resistors R46 and R48. The collector of the transistor Q23 has a biasing resistor R49 connected in series therewith and to the input I-13. The emitter of the transistor Q23 is connected to a common ground.

The control unit 213 also includes a second transistor Q24 having the base drive thereof connected to the collector of the transistor Q23. The collector of the transistor Q24 is connected both to the input I-1 and to a biasing resistor R50 which, in turn, is connected to input I-13. The emitter of the transistor Q24 is also connected to the common ground.

The voltage divider circuit 200 includes a second control unit 214 for controlling the potential at the terminal P. The control unit 214 includes a transistor Q21 which has the base drive thereof connected to the circuit 211 between the resistors R41 and R43. The collector of the transistor Q21 is connected to a biasing resistor R44 while the emitter thereof is connected to the common ground. The control unit 214 also includes a transistor Q22 having a base drive connected to the collector of the transistor Q21. The collector of the transistor Q22 is connected to a biasing resistor R45 while the emitter thereof is connected to the common ground. The collector of the transistor Q22 is also connected to the terminal P through the input I-2.

Inasmuch as the control circuits 202 are identical, only that control circuit which is connected between the input I-25 and the input I-3 will be described in detail. The control circuit 202 includes transistors Q9 and Q19. The base of the transistor Q9 is connected to the input I-3 through a resistor R19. It is also connected to the input I-13 through a resistor R9. The collector of the transistor Q9 is connected to the emitter of a like transistor of a next adjacent control circuit 202. The emitter of the transistor Q9 is connected to the input I-25 through a diode D9.

The transistor Q19 has the base thereof connected to the input I-3 through a resistor R39 and to the + 8v. source of the input I-13 through a resistor R29. The collector of the transistor Q19 is connected to the input I-25 through the diode D19. The emitter of the transistor Q19 is connected to the control circuit 211 intermediate the resistors R41 and R42.

At this time it is pointed out that the transistors of the control circuits 202 which correspond to the transistor Q9 are connected in series, collector to emitter and terminally to the circuit 212 intermediate the resistors R46 and R47.

The values and/or identifications of the various components of the comparator module 111 are found in the following table:

| | |
|---|---|
| Resistors R1 through R10, R43, R48 | 15K |
| Resistors R11 through R20 | 22K |
| Resistors R21 through R30 | 47K |
| Resistors R31 through R40, R41, R46 | 10K |
| Resistors R42, R45, R47 | 1K |
| Resistors R44 | 6.8K |
| All Diodes | Diode IN914 |
| Transistors Q1 through Q10 | Transistor 2N3638 |
| Transistors Q11 through Q24 | Transistor 2N3567 |

GENERAL DESCRIPTION OF COMPARATOR MODULE CIRCUIT

The transistors Q1 through Q10, which are all connected in series, are all forward biased. In other words, they are all in the conductive stage unless they receive a "true" signal from the encoder 91. The encoder signals consists of a "true" signal being ground and a "false" signal being — 25v.

The transistors Q11 through Q20 are all back biased. In other words, they are all turned off until they receive a "true" signal from the encoder 91 at which point the specific transistor which receives the signal is brought into a conductive stage. The forward biasing of the transistors Q1 through 10 and the back biasing of the transistors Q11 through Q20 is accomplished through the voltage divider networks connected to the bases of the transistors.

It is to be understood that there will be one input at the left of the control system 201 and one input at the right of the control system 201. This provides for three possible situations which are as follows:

1. Equality
2. Card Reader Signal Smaller Than Transducer Signal
3. Card Reader Signal Larger Than Transducer Signal Considering first the situation where there is equality, and assuming that the switch 207 for the input I-21 is closed and the switch 205 of the input I-7 has shifted to be connected to ground, with all of the other terminals I-3 through I-12 having — 25v. Applied thereto, it can be seen that:

A. Current will flow from ground through the respective card reader switch 207 through transistor Q15 and resistor R42 to the — 8v. supply at terminal I-14. This upsets the biasing network R42, R41, and R43 and brings the transistor Q21 into conductive stage. The base of transistor Q22 is, therefore, brought to a near ground potential, thereby turning this transistor off and bringing the potential at terminal P to + 8v. through the resistor R45.

B. Since transistor Q5 has been turned off by the "true" signal to ground through the encoder 91, current cannot flow through the string of transistors Q5, Q4, Q3, Q2, Q1 and Q10. Therefore, the biasing network consisting of resistors R47, R46, R48 will keep the transistor Q23 turned off, thereby keeping the base voltage on transistor Q24 at a plus potential and the transistor Q24 in the conductive stage. Thus, the signal of terminal F will be at ground potential.

Considering next the situation where the card reader signal is smaller than the transducer signal, and wherein the switch 207 connected to the terminal I-19 is closed while the switch 205 associated with the terminal I-7 is connected to ground, the transistor Q5 will be turned off while all other transistors Q1 through Q10 are turned on. The respective switch 207 provides ground through the diode D3. It can, therefore, be seen that:

A. Current will flow through Diode D3, transistors Q3, Q2, Q1 and Q10, thereby upsetting the biasing network consisting of resistors R47 R46, and R48 and turning transistor Q23 on. This, in turn, turns transistor Q24 off, resulting in the signal at terminal F being + 8 v. through resistor R50.

B. Since no current can flow through resistor R42 from ground, the − 8 v. biasing voltage through resistors R42 and R41 into the base of transistor Q21 will keep this transistor turned off. Consequently, transistor Q22 is turned on through resistor R44 leaving the signal at terminal P at ground potential.

When the card reader signal is larger than the transducer signal, assuming the switch 207 connecting the terminal I–23 to ground is closed and the switch 205 for the terminal I–7 is also connected to ground, the following condition exists. As in previous cases, transistor Q5 is turned off while all other transistors Q1 through Q10 are turned on. On the other hand, transistor Q17 associated with terminal I–23 remains turned off notwithstanding the connection of terminal I–23 to ground. It can, therefore, be seen that:

A. Since no current can flow through resistor R42 from ground, the − 8 v. biasing voltage through resistors R42 and R41 into the base of transistor Q21 will keep this transistor turned off. Consequently, transistor Q22 is turned on through resistor R44 leaving the signal at terminal P at ground potential.

B. Since transistor Q5 has been turned off by the "true" signal to ground through the encoder 91, current cannot flow through the string of transistors Q5, Q4, Q3, Q2, Q1 and Q10. Therefore, the biasing network consisting of resistors R47, R46 R48 will keep the transistor Q23 turned off, thereby keeping the base voltage on transistor Q24 at a plus potential and the transistor Q24 in the conductive stage. Thus, the signal appearing at terminal F will be also at ground potential.

A further discussion of the circuitry and operation of the comparator module 111 is believed to be unnecessary.

It is to be understood that although the invention has been specifically illustrated and described in conjunction with a grinding machine and the feed mechanism has been specifically limited to the positioning of a support for a grinding wheel, the invention is not so limited. It is to be understood that the invention may be utilized in other types of machine tools. It is also to be understood that in certain machines, it may be more feasible to hold the machining element in a relatively fixed position and to advance and/or retract the workpiece. These modifications may be readily made without departing from the spirit and scope of the invention, as defined by the appended claims.

I claim:

1. In a machine tool of the type readily adjustable for machining workpiece portions of different sizes and wherein said machine tool includes,
   a. a bed,
   b. a slide mounted on said bed,
   c. feed means for shifting said slide to selected positions in accordance with the workpiece dimension to be machined,
   d. said feed means including a positioning mechanism having a driving member.
   e. and control means for actuating said driving member to position said slide, the improvement residing in said control means and including
   f. a logic circuit having means for receiving and comparing data indicating the existing position of said slide with data corresponding to the desired new position of said slide and actuating said driving member accordingly to automatically shift said slide to said desired new position.

2. The machine tool of claim 1 together with
   a. an encoder,
   b. means coupling said encoder to said driving member for actuation thereby, and
   c. means for varying the characteristics of said encoder in accordance with the desired new position of said slide.

3. The machine tool of claim 1 wherein said control means includes
   a. a control circuit for controlling the actuation of said driving member and the direction of drive of said driving member, and
   b. said logic circuit being connected to said control circuit in controlling relation thereto.

4. The machine tool of claim 1 wherein said control means includes
   a. a control circuit for controlling the actuation of said driving member and the direction of drive of said driving member, and
   b. said logic circuit being connected to said control circuit in controlling relation thereto,
   c. said logic circuit having separate circuits each representing a digit in the dimensional position of said slide and operable in conjunction with one another to control the direction of drive and to terminate the actuation of said driving member in accordance with the relationship of the existing slide position and the desired new slide position.

5. The machine tool of claim 1 wherein said control means includes
   a. a control circuit for controlling the actuation of said driving member and the direction of drive of said driving member, and
   b. said logic circuit being connected to said control circuit in controlling relation thereto,
   c. said driving member having a plurality of driving speeds, and
   d. said control circuit including a drive sequencing circuit for sequentially decreasing the driving speed of said driving member.

6. The machine tool of claim 5 wherein
   a. there is a set sequence of movement of said slide as determined by said drive sequencing circuit with said slide moving past the intended new position thereof during each movement except for a final movement, and said drive sequencing circuit provides for the final movement of said slide to always be in the same direction irrespective of the initial direction of movement.

7. The machine tool of claim 1 wherein said logic circuit includes
   a. two final gate circuit members,
   b. one of said gates controlling the direction of drive of said driving member, and
   c. the other of said gates being operable to terminate drive when said slide reaches the desired new position.

8. The machine tool of claim 1 wherein
   a. said logic circuit is a sequentially operating circuit and
   b. operation of said logic circuit is in accordance with the most significant digit of the dimensional input thereto.

9. The machine tool of claim 1 wherein
   a. said logic circuit has a primary control in the form of comparator modules each capable of receiving and comparing an existing position dimension and a desired new position dimension.

10. The machine tool of claim 1 wherein said logic circuit includes
    a. a predetermined number of input circuits, and
    b. a plurality of like primary control gate circuit members each having a number of inputs less than the number of input circuits of said logic circuit.

11. The machine tool of claim 1 wherein said logic circuit includes
    a. a predetermined number of input circuits,
    b. a plurality of like primary control gate circuit members each having a number of inputs less than the number of input circuits of said logic circuit, and
    c. a single secondary control gate circuit member having a number of inputs equal to the number of input circuits.

12. The machine tool of claim 1 wherein a. said logic circuit has a primary control in the form of comparator modules each capable of receiving and comparing an existing position dimension and a desired new position dimension, and said logic circuit includes b. a plurality of like gate circuit members receiving controlling inputs from said comparator modules, c. each of said gate circuit members having a number of inputs less than the number of comparator modules.

13. The machine tool of claim 12 wherein a. each of said comparator modules has two output terminals, one of which is energized only when the dimensions received thereby are equal, and b. said one terminal outputs being operable to energize said gate circuit members in sequence.

14. The machine tool of claim 12 wherein a. each of said comparator modules has first and second output terminals, b. each first terminal having a signal present only when the present digit reading is greater than the new digit reading, and c. each second terminal having a signal present only when the digit readings are the same.

15. The machine tool of claim 12 wherein a. all of said gate circuit members are interconnected for sequential operation in accordance with the most significant digit available for control.

16. The machine tool of claim 12 wherein a. all of said gate circuit members are interconnected for sequential operation in accordance with the most significant digit available for control, and b. one of said gate circuit members being a circuit controlling member for others of said gate circuit members, c. said one gate circuit members having inputs from certain of the first effective ones of said comparator modules and an output controlling others of said gate circuit members.

17. The machine tool of claim 1 wherein a. the machine tool has a machining element subject to a dimensional change, b. and said feed means includes an actuating device operable independently of the positioning mechanism and without changing the position thereon to shift said slide in accordance with the machine element dimensional change.

18. In a machine tool of the type readily adjustable for machining workpiece portions of different sizes and wherein said machine tool includes, a. a bed, b. a slide mounted on said bed, c. feed means for shifting said slide to selected positions in accordance with a workpiece dimension to be machined, d. said feed means including a positioning mechanism having a driving member, e. and control means for actuating said driving member to position said slide, said control means being operable to sequentially move said slide to opposite sides of a desired new position at a decreasing speed rate and with decreasing overrun and finally advancing to the new position at a very low rate and stopping at said new position, the improvement residing in said control means having f. means operable to shift said slide in opposite directions with the last movement of said slide always being in the same direction irrespective of the initial direction of shifting.

19. The machine tool of claim 18 wherein said control means includes a. means for receiving a desired new position for said slide in the form of a numerical signal-type input.

20. The machine tool of claim 18 wherein a. said machine tool is a grinding machine and said slide supports a grinding wheel.

21. In a machine tool of the type readily adjustable for machining workpiece portions of different sizes and wherein said machine tool includes, a. a bed, b. a slide mounted on said bed, c. feed means for shifting said slide to selected positions in accordance with a workpiece dimension to be machined, d. said feed means including a positioning mechanism having a driving member, e. and control means for actuating said driving member to position said slide, said control means being operable to sequentially move said slide to opposite sides of a desired new position at a decreasing speed rate and with decreasing overrun and finally advancing to the new position at a very low rate and stopping at said new position, the improvement residing in said control means having f. means for receiving a desired new position for said slide in the form of a numerical signal-type input.

22. The machine tool of claim 1 together with a. an encoder, b. means coupling said encoder to said driving member for actuation thereby, c. said encoder having means for providing a signal representing the instantaneous position of said slide in terms of numerical dimension of the workpiece, d. means for varying the characteristic of said encoder in accordance with the desired new position of said slide, and e. said control means including means to transform said signal from said encoder into the movement of said slide in a predetermined direction at a predetermined speed.

23. The machine tool of claim 1 together with a. an encoder, b. means coupling said encoder to said driving member for actuation thereby, c. said encoder having means for providing a signal representing the instantaneous position of said slide in terms of numerical dimension of the workpiece, d. means for varying the characteristic of said encoder in accordance with the desired new position of said slide, and e. said control means including means to transform said signal from said encoder to selectively move said slide and stop said slide.

24. The machine tool of claim 1 wherein said control means includes a. a control circuit for controlling the actuation of said driving member and the direction of drive of said driving member, and b. said logic circuit being connected to said control circuit in controlling relation thereto, c. said logic circuit having separate circuits each representing a digit in the dimensional position of said slide operable in conjunction with one another to control the direction of drive and to terminate the actuation of said driving member in accordance with the relationship of the existing slide position and the desired new slide position.

25. The machine tool of claim 12 wherein a. each of said comparator modules has first and second output terminals, b. each first terminal having a signal present only when the present digit reading is different than the new digit reading, and c. each second terminal having a signal present only when the digit readings are the same.

26. The machine tool of claim 1 wherein the primary control for said logic circuit is in the form of comparator modules each capable of receiving and comparing an existing position dimension and a desired new position dimension and supplying two separate predetermined signals in accordance with the relationship of the two dimensions, each comparator module comprising a voltage divider circuit having a control circuit operatively associated with each half thereof and each said control circuit supplying one of said signals, and a control system for receiving said two inputs and being operatively connected to said voltage divider circuit for unbalancing said voltage divider circuit in a predetermined manner in accordance with the relative values of said two inputs and thereby actuate said control circuits to supply said signals.

27. The machine tool of claim 1 wherein said logic circuit includes,
a. a plurality of elements having available electrical signals,
b. a plurality of like gate circuit members each having a number on inputs less than the number of said elements, and
c. means connecting said gate circuit members for sequential operation by said element signals.

28. The machine tool of claim 1 wherein said control means includes a comparator module for comparing the value of two inputs and supplying two separate predetermined signals in accordance with the relationship of the two inputs, said comparator module comprising a voltage divider circuit having a control circuit operatively associated with each half thereof and each said control circuit supplying one of said signals, and a control system for receiving said two inputs and being operatively connected to said voltage divider circuit for unbalancing said voltage divider circuit in a predetermined manner in accordance with the relative values of said two inputs and thereby actuate said control circuits to supply said signals.